United States Patent

Hulthen et al.

Patent Number: 6,073,016
Date of Patent: *Jun. 6, 2000

[54] MOBILE DEVICE ID ALLOCATION SYSTEM AND METHOD

[75] Inventors: Matthew R. Hulthen, Akron; Bindya R. Patel, Medina; Mark A. Criss, Stow; Phillip C. Minor, Barberton; Frank D. Ciotti, Jr., Solon, all of Ohio

[73] Assignee: Telxon Corporation, Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,405

[22] Filed: Jan. 2, 1997

[51] Int. Cl.$^7$ ..................................................... H04Q 7/20

[52] U.S. Cl. .............................................. 455/435; 455/432

[58] Field of Search .......................... 370/338; 455/432, 455/435, 433, 509, 426, 514, 518, 519

[56] References Cited

U.S. PATENT DOCUMENTS

| | | | |
|---|---|---|---|
| 4,833,701 | 5/1989 | Comroe et al. | 455/509 |
| 5,519,706 | 5/1996 | Bantz et al. | 370/85.3 |
| 5,613,214 | 3/1997 | Shirasawa et al. | 455/435 |
| 5,625,887 | 4/1997 | Cassidy et al. | 455/509 |
| 5,748,620 | 5/1998 | Capurka | 455/435 |
| 5,794,145 | 8/1998 | Milam | 455/426 |
| 5,812,949 | 9/1998 | Taketsugu | 455/439 |

*Primary Examiner*—Reinhard J. Eisenzopf
*Assistant Examiner*—Darnell R. Armstrong
*Attorney, Agent, or Firm*—Amin, Eschweiler & Turocy, LLP

[57] ABSTRACT

A network communication system and method with mobile communication unit ID allocation wherein a mobile communication unit may request that an identification code be assigned for starting a session with a host computer or other device coupled to a network and wherein the host computer or other device assigns the mobile communication unit with an available identification code if any are available.

20 Claims, 9 Drawing Sheets

Fig. 7A

| IDENTIFICATION CODE | 32-bit RANDOM NUMBER |
|---|---|
| 00010001 | 00000000000000000000000100100101 |
| 00010010 | 00000000000000000000010100101101 |
| 00010011 | 00000000000000000000000101101111 |
| 00010100 | 00000000000000000000000000000011 |
| 11111110 | 11111111111111111111111111111101 |

| AVAILABLE IDENTIFICATION CODES | | | | |
|---|---|---|---|---|
| 00010000 | 00010110 | 00011100 | 00100010 | |
| ● | 00010111 | 00011101 | 00100011 | |
| ● | 00011000 | 00011110 | 00100100 | |
| ● | 00011001 | 00011111 | 00100101 | |
| ● | 00011010 | 00100000 | 00100110 | |
| 00010101 | 00011011 | 00100001 | 00100111 | | ns

MOBILE DEVICE ID ALLOCATION SYSTEM AND METHOD

TECHNICAL FIELD OF THE INVENTION

The present invention relates generally to network communication systems, such as local area networks (LANs), and more particularly to network cellular communication systems which are accessed by one or more mobile communication units.

BACKGROUND OF THE INVENTION

In recent years, the use of communication systems having wireless mobile communication units which communicate using an optical or radio link with a hardwired network, such as a local area network (LAN), has become quite widespread. Retail stores and warehouses, for example, may use such systems to track inventory and replenish stock. Employees may enter inventory information using a hand held or portable communication unit which can be carried through the store or warehouse. In manufacturing facilities, such systems are useful for tracking parts, completed products and defects. In a medical environment, these systems can reduce the time needed to fill out forms and eliminate inaccuracies by allowing medical personnel to transmit data directly from a mobile communication unit carried by the medical personnel.

A conventional communication system generally includes a number of fixed base stations (i.e., access points) interconnected by a cable medium to form a hardwired backbone network. The network medium may be a twisted pair cable, shielded coaxial cable for fiber optic lines, for example. Each base station has a service area or cell surrounding the base station within which it has the ability to transmit and to receive relatively error-free data from a mobile communication unit within the area.

In such a network, a mobile communication unit must initially register itself with a base station and then attempt to begin a session with a host computer whereby the host allows communication to occur between itself and the particular mobile communication unit. More particularly, when a mobile communication unit is powered up, it "registers" with a base station. However, as the location of this mobile communication unit changes, the mobile communication unit may register with another base station, thereby resulting in a deregistration with the previous base station. Furthermore, deregistration will sometimes occur if there is no communication between the mobile communication unit and its corresponding base station within a predetermined period of time. Thus, in such communication systems, mobile communication units register and deregister frequently as the mobile communication units are moved about.

As mentioned above, each mobile communication unit within the communication system must also begin and maintain a session with the host computer (or other device which provides application or information based services) once it has registered with a base station. A session is typically only initiated once at start up by each mobile communication unit and is active until such time as the mobile communication unit ends the session regardless of the number of registrations and deregistrations which may have taken place with respect to base stations during this period. In order for the mobile communication unit to enter into the system and begin a session with the host computer, the mobile communication unit must have a unique system identification code (ID). The ID allows the host computer or other device on the backbone handling session requests to recognize and distinguish each mobile communication unit.

Mobile communication units which do not come equipped with hardware which preassigns a unique address (such as a medium access control (MAC) address) must handle addressing via software. Typically, for example, upon shipping one or more mobile communication units to a location for interfacing with a network communication system a programmer at the location would individually program each mobile communication unit with a unique system ID. The mobile communication units cannot be preprogrammed with the system ID because it is possible that the system in which the mobile communication units are about to be used are already supporting other mobile communication units and care must be taken to ensure that duplicate device ID's are not granted.

Unfortunately, the process of individually programming each mobile communication unit requires that trained personnel be on site to complete the programming and physically handle each mobile communication unit to perform the necessary initialization steps. This of course often results in significant delay times from the time shipment of the product is received to when such mobile communication units can actually communicate within the network system. Furthermore, such location based programming efforts can be substantially costly.

Accordingly, there is a strong need in the art for a system and method which eliminates the need to individually, manually program mobile communication units with a unique system ID so that the mobile communication units can properly communicate in a network communication system. In particular, there is a strong need in the art for an ID assignment system which detects a mobile communication unit which is attempting to access a communication system (i.e., with a session request or base station registration process) without a valid ID or any ID at all, and which assigns a valid ID to the mobile communication unit so that the mobile communication unit may access the network system.

SUMMARY OF THE INVENTION

The present invention provides a network communication system and method with mobile communication unit ID allocation. In accordance with the invention, a mobile communication unit, attempting to register to a network without a valid identification code or any identification code at all is detected and provided with a valid identification code so that the mobile communication unit can access the network. For purposes of this invention and the accompanying claims, it is to be understood that the phrase "registered to a communication network", "registered to the backbone" and the like, includes the mobile communication unit being in a session or beginning a session with a host computer, base station or other device which establishes a connection for exchanging application and/or informational based communications with such device. Such registration is understood to remain constant even if the mobile communication device roams from cell to cell. These terms are to be distinguished from a mobile communication unit registering itself with a base station or access point for the purpose of gaining access to the network wherein such registration is understood to change as the mobile communication unit roams from cell to cell. Moreover, it is to be understood that the terms "mobile communication unit," "mobile device" and "mobile terminal" are used interchangeably throughout the specification and/or claims.

In a preferred embodiment, a network communication system is provided, including: a network backbone; a mobile communication unit including a transmitter system for wirelessly transmitting information and a receiver system for wirelessly receiving information, the mobile communication unit further including circuitry for registering to the backbone; and a device coupled to the backbone, the device including circuitry for allocating an available ID to at least one mobile communication unit.

According to one particular aspect of the invention, a communication system with identification code assignment is provided, including: at least one mobile terminal; a network; a host computer coupled to the network; at least one base station coupled to the network, the at least one base station including circuitry for wirelessly transmitting and receiving information, and providing the at least one mobile terminal with access to the network such that the at least one mobile terminal can communicate with the host computer; and at least one processor in the communication system for determining if a particular mobile terminal of the at least one mobile terminals is attempting to begin a session without an available identification codes, wherein the processor is capable of attempting to assign an available identification code to the particular mobile terminal in the event the mobile terminal is attempting to begin a session without an available identification code.

According to a further aspect of the invention, a mobile terminal is provided, including: a transmitter system for wirelessly transmitting communication; a receiver system for wirelessly receiving communication; and circuitry for beginning a session, wherein in the event the mobile terminal has not already been assigned an available ID, the circuitry for beginning a session transmits a request for an available ID to be assigned.

Furthermore, in accordance with yet another aspect of the invention, a host computer is provided, including: means for determining whether an ID is currently available; and means for allocating an available ID to a mobile device requesting an available ID be assigned.

According to another aspect of the invention, a method of assigning a mobile communication unit an ID for registration to a communication network, the communication network including a backbone and a host computer coupled to the backbone is provided, the method including the steps of: receiving at the host computer a request from a mobile communication unit to have an available ID assigned to the mobile communication unit; determining by the host computer if there remains any available IDs to be assigned; and transmitting to the mobile communication unit from the host computer an available ID to be assigned, in the event there remains any available IDs.

To the accomplishment of the foregoing and related ends, the invention then comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the drawings:

FIG. 7A is an illustration of a table of identification codes of respective mobile communication units and their respective 32-bit random numbers which are maintained by a host computer according to the present invention; and FIG. 7B is an illustration of a table of available identification codes which is maintained by a host computer according to the present invention.

DESCRIPTION OF THE PREFERRED EMBODIMENTS

Figure 1:
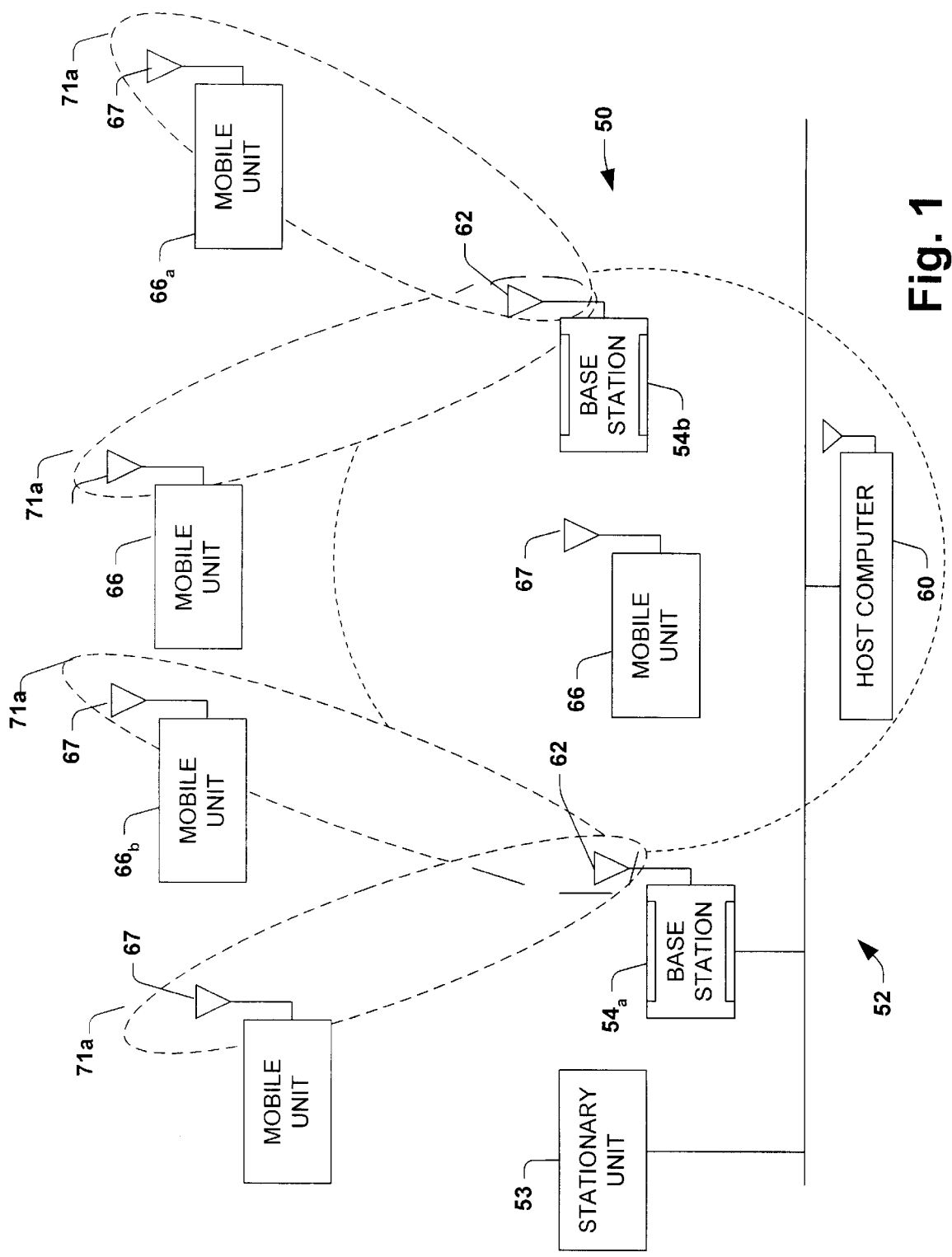
FIG. 1 is a system diagram of a network communication system in accordance with the present invention.

The present invention will now be described with reference to the drawings wherein like reference numerals are used to refer to like elements throughout. As mentioned above, the present invention relates to cellular communication systems which include mobile communication units that can roam from cell to cell. Such mobile communication units can be data terminals, telephones, pagers, etc. In the exemplary embodiment described hereinafter, the mobile communication unit is a mobile data terminal used to communicate data such as inventory or the like. However, it is recognized that the invention contemplates other types of mobile devices and is not intended to be limited to systems using mobile data terminals.

Referring now to FIG. 1, a cellular communication system 50 is shown in accordance with an exemplary embodiment of the present invention. The cellular communication system 50 includes a network backbone 52. The network backbone 52 may be a hardwired data communication path made of twisted pair cable, shielded coaxial cable or fiber optic cable, for example, or may be wireless or partially wireless in nature. Coupled to the network backbone 52 are a stationary communication unit 53 and several base stations 54. Only one base station $54_a$ is shown hardwired to the network backbone 52, however, it is understood that more than one hardwired base station $54_a$ may be physically connected to the network backbone 52. The base stations 54 may be hardwired to the network backbone 52 such as base station 54$_a$ or may wirelessly couple to the backbone 52 such as base station 54$_b$. Each base station 54 serves as an entrance point through which wireless communications may occur with the network backbone 52. The wireless base station 54$_b$ may be employed to expand the effective communication range of the cellular communication system 50. As is conventional, each wireless base station 54$_b$ associates itself, typically by registration, with another base station or a host computer 60 coupled to the network backbone 52, whether hardwired or wireless, such that a link is formed between itself and other devices situated on the network backbone 52.

Each base station 54 is capable of wirelessly communicating with other devices in the communication system 50 via respective antennas commonly denoted by reference numeral 62. The antenna 62 for any particular device may be of any type suitable for use in a network cellular communication system, such as an omni-directional antenna, a yagi-type antenna, etc. A geographic cell (not shown) associated with each base station 54 defines a region of coverage in which successful wireless communications may occur. Depending on the type of antenna 62 selected and output power of the respective base station 54, the geographic cell may take one of several different forms and sizes. For example, the antenna 62 could be an omni-direction antenna if a generally spherical cell area of coverage is desired. A directed yagi-type antenna could be used as the antenna 62 for a more directed elliptical cell area of coverage.

The cellular communication system 50 also includes one or more mobile communication units 66. The mobile communication units 66 each include an antenna 67 for wirelessly communicating with other devices. Each mobile communication unit 66 communicates with devices on the network backbone 52 via a selected base station 54 and/or with other mobile communication units. Upon roaming from one cell to another, the mobile communication unit 66 is configured to associate itself with a new base station 54 or directly with the host computer 60 if within range. A mobile communication unit 66 registers with a particular base station which provides the particular mobile communication unit with wireless access to the network backbone 52. The manner in which each of the mobile communication units are registered with a particular base station 54 is discussed in more detail below in connection with FIG. 4.

As will be presented in greater detail below, the network cellular communication system 50 of the present invention is able to determine if a mobile communication unit is attempting to access the network without a valid identification code or no identification code at all. For example, still referring to FIG. 1, mobile communication unit 66 is already registered to the network backbone 52 under an identification code (e.g., ID=00110111). If a second mobile communication unit 66 attempts to register to the network without an identification code or an invalid identification code, a processor determines that mobile communication unit 66B is attempting to access the network without proper authorization (i.e., a valid ID). In the exemplary embodiment the processor is part of the host computer 60, however, it is to be understood that the processor could be part of a base station 54. The processor, as discussed in significantly greater detail below, will refuse registration of the second mobile communication unit 66B to the network backbone 52 until it is assigned or determined to already have a valid identification code.

Figure 2A:
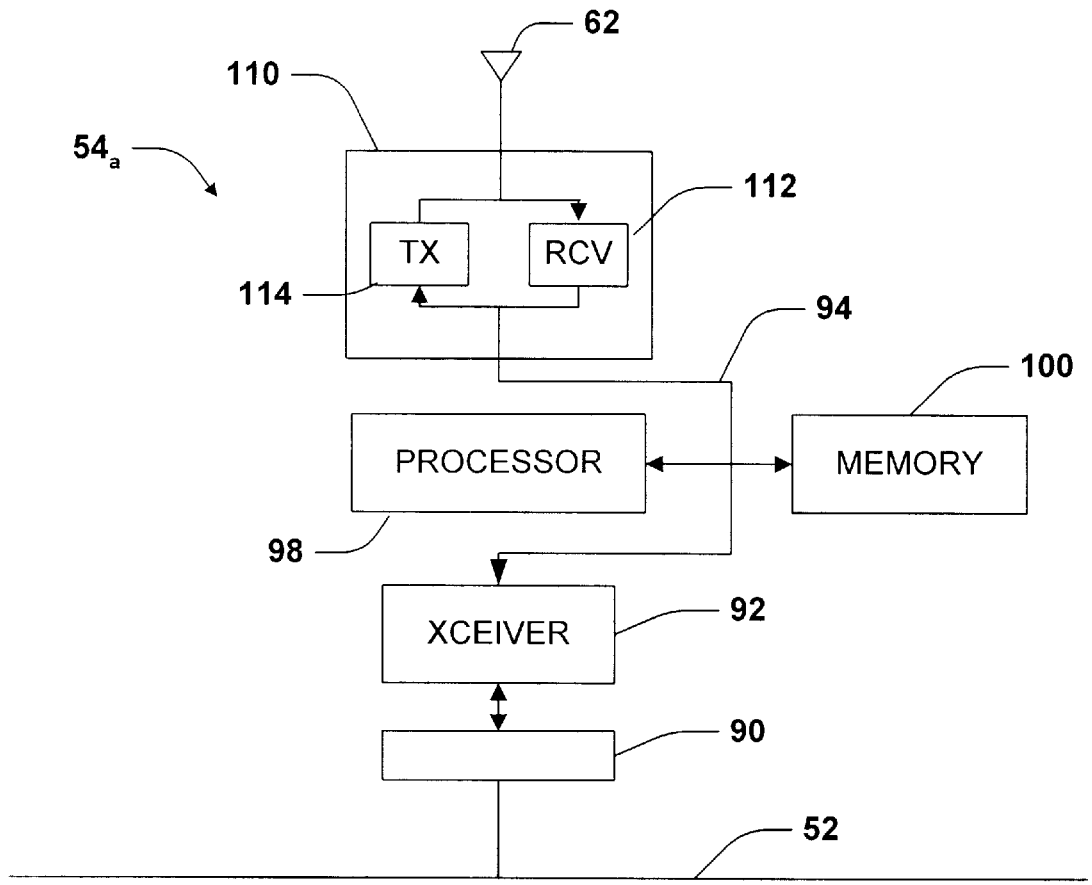
FIG. 2A is a block diagram of a hard wired base station in accordance with the present invention.

FIG. 2A is a block diagram representative of each hardwired base station 54$_a$. Each hardwired base station 54$_a$ is connected to the network backbone 52 via a connector 90 such as a DB-9 or RJ-45 connector. The connector 90 is connected to the network backbone 52 at one end and to a network adapter transceiver 92 included in the base station 54$_a$ at the other end. The network adapter transceiver 92 is configured according to conventional adapter transceiver techniques to allow the base station 54$_a$ to communicate over the network backbone 52. The network adapter transceiver 92 is also connected to an internal bus 94 included within the base station 54$_a$. The base station 54$_a$ further includes a processor 98 connected to the bus 94 for controlling and carrying out the operations of the base station 54$_a$. The processor 98 may include any of a variety of different microprocessors, such as the Motorola 68360 or Intel 80486 microprocessors. It is understood that any suitable processor capable of carrying out the herein described functions of the base stations 54$_a$ may be used and falls within the scope of this invention.

The base station 54$_a$ also includes a memory 100 connected to the bus 94. The memory 100 stores program code executed by the processor 98 for controlling the other elements within the base station 54$_a$ to carry out the functions described herein. It will be readily apparent to a person having ordinary skill in the art of microprocessor programming how to program the processor 98 to carry out the operations described herein using conventional programming techniques based on the flowcharts/flow diagrams and descriptions provided herein. Accordingly, additional detail as to the specific program code has been omitted. The memory 100 also serves to buffer packets of information such as those received over the network backbone 52 or those transmitted to or received from the mobile communication units 66 or wireless base stations 54$_b$. Furthermore, the memory 100 may store tables relating to which of the mobile communication units 66 are registered to the network backbone 52 and/or the identification codes of the mobile communication units 66.

Also connected to the bus 94 is a radio frequency (RF) section 110 included in the base station 54a. The RF section 110 includes the aforementioned antenna 62 for receiving radio signals from and transmitting radio signals to mobile communication units 66 and wireless base stations 54$_b$ (FIG. 2B) within the cell area of the base station 54$_a$. Information transmitted from a mobile communication unit 66 or a wireless base station 54$_b$ is received via the antenna 62 and is processed by an RF receiver 112 which is connected to the bus 94 and demodulates and decodes the signal and converts the signal to a digital signal having a packet format as discussed below in connection with FIGS. 4A and 4B. The processor 98 controls an RF transmitter 114 included in the RF section 110, the RF transmitter also being connected to the bus 94. The processor 98 causes the RF transmitter 114 to modulate and transmit an RF signal which in turn carries the information packet (FIGS. 4A and 4B) to he appropriate mobile communication unit 66 or wireless base station 54$_b$.

The processor 98 in the base station 54$_a$ inserts source routing information into the source routing field of the packet that is received from the mobile communication unit 66, if needed. Thereafter, the processor 98 stores the packet in the memory 100 until such time as the base station 54$_a$ is able to transmit the information packet onto the network backbone 52 via the network adapter transceiver 92 and connector 90.

Figure 2B:
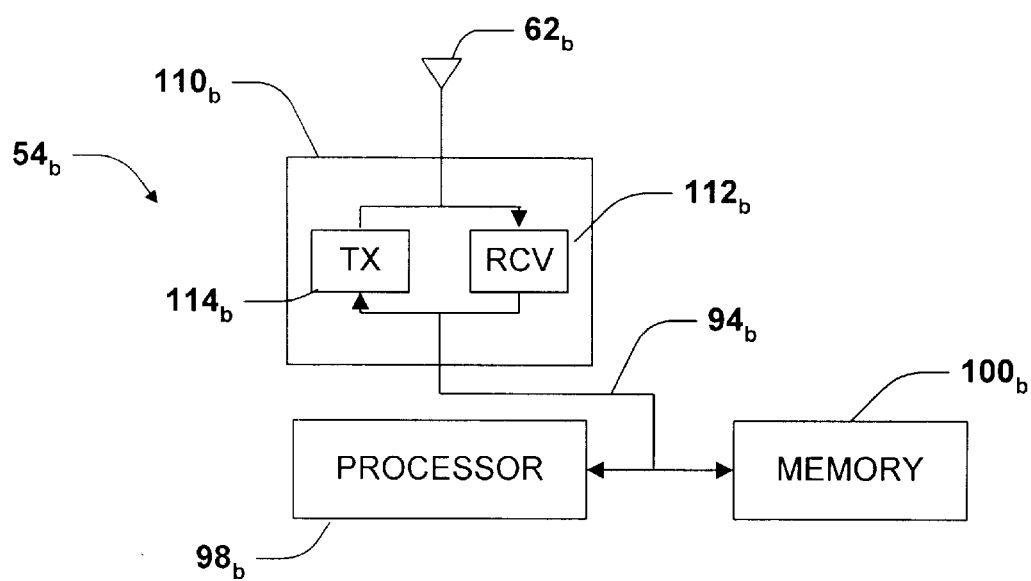
FIG. 2B is a block diagram of a wireless base station in accordance with the present invention.

FIG. 2B is a block diagram representative of each wireless base station 54$_b$ in the system 50. For the most part, the construction and operation of the components within the wireless base station 54$_b$ are identical to those described with respect to the base stations $54_a$. Hence, similar components are denoted simply by the addition of a [b]. For example, the processor 98 in the base station $54_a$ is equivalent to the processor $98_b$ in the wireless base station 54b. However, the wireless base station $54_b$ is not connected directly to the network backbone 52 and therefore does not include a network transceiver 92 or connector 90 as in each base station $54_a$. Rather, the wireless base station $54_b$ communicates with mobile communication units 66 registered thereto and with the particular base station with which the wireless base station $54_b$ is associated with via the RF section $110_b$. Operations of the two base stations $54_a$ and $54_b$ are primarily the same with the exception of the particular procedures described herein. As mentioned above, the wireless base stations $54_b$ function to extend the relative cell coverage of a given base station $54_a$, and serve primarily to relay information between the base stations $54_a$ connected to the network backbone 52 and the mobile communication units 66.

Figure 2C:
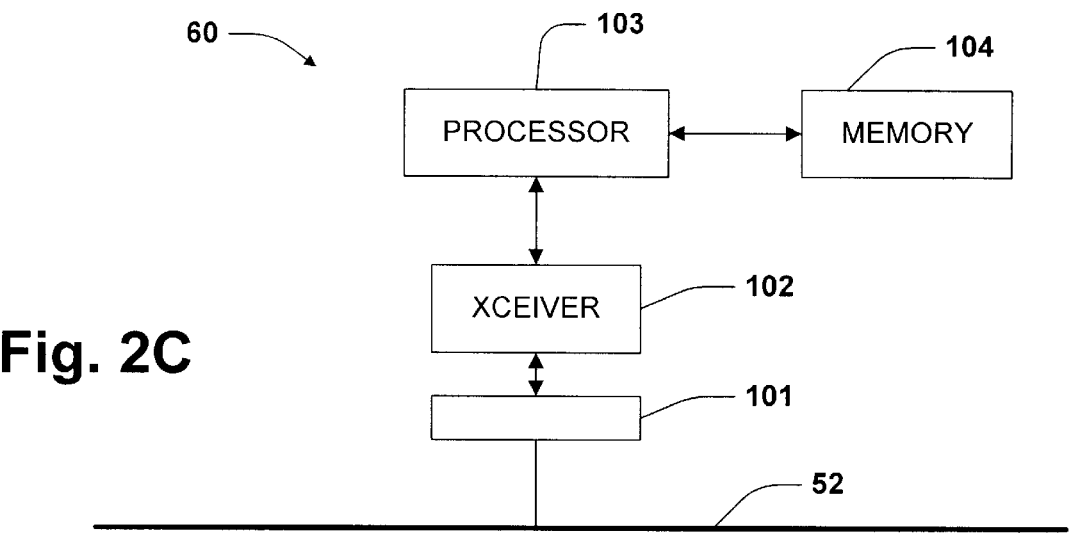
FIG. 2C is a block diagram of a host computer in accordance with the present invention.

FIG. 2C is a block diagram representative of the host computer 60 of the present invention. Although operations performed by the host computer 60 are conventionally different than the operations of a base station 54, the hardware components are similar to those hardware components described with respect to base station $54_a$ in FIG. 2A. Hence, the function and interconnection among the hardware components will not be described again in detail. Rather, as shown in FIG. 2C, similar to base station $54_a$, the host computer includes a backbone connector 101, a transceiver 102, a processor 103 and a memory 104. Unlike the base stations 54, however, the host computer 60 of this particular embodiment does not include an RF section 110. Thus, in order for the host computer 60 to communicate with any mobile communication unit 66, the host computer 60 must route all such communication over the backbone 52 and through one of the base stations 54. Similarly, for a mobile communication unit 66 to communicate with the host computer 60, the mobile communication unit 66 must first access the network backbone 52 through one of the existing base stations 54 which will then ensure the communication is properly delivered to the host computer 60. The host computer 60 serves as a central unit where large operational based and application based software programs are stored and executed in order to provide the necessary functions which the communication system 50 was installed to perform. As will be discussed in greater detail below, the host computer 60 determines whether or not a mobile communication unit 66 attempting to access the network has proper authorization (i.e., a valid identification code). The host computer 60 makes such determination based on information as to the mobile communication units 66 within the system, their respective IDs and other identifying indicia (e.g., random 32 bit numbers). If the mobile communication unit 66 does not have a valid identification code, the host computer 60 will not allow the particular mobile communication unit to begin a session.

Figure 3:
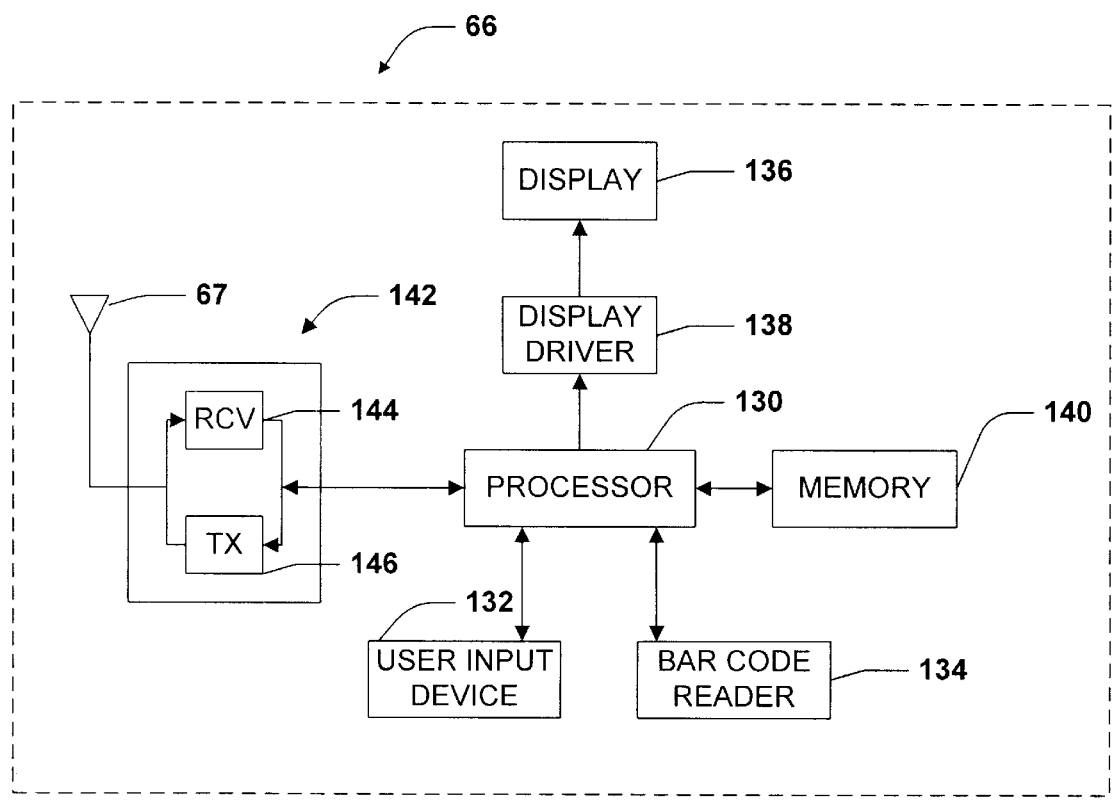
FIG. 3 is a block diagram of a mobile communication unit in accordance with the present invention.

FIG. 3 is a block diagram representing the basic structure of each mobile communication unit 66 according to the exemplary embodiment. Each mobile communication unit 66 includes a processor 130 which can be programmed to control and operate the various components within the mobile communication unit 66 in order to carry out the various functions described herein. The processor 130 has coupled thereto a user input device 132 which allows a user to input data to be communicated to the network backbone 52 such as inventory data, patient information, etc. This information may be sent to the host computer 60 which serves as a central data location, for example, or to a cash register connected to the network backbone 52, and another example, for providing price information. The input device 132 can include such items as a keypad, touch sensitive display, etc. The mobile communication unit 66 also may include a bar code scanner 134 coupled to the processor 130 serving as another form of data input. A display 136 is connected to and controlled by the processor 130 via a display driver circuit 138. The display 136 serves as a means for displaying information stored within the mobile communication unit 66 and/or received over the network backbone 52 via a base station 54. The display 136 can be a flat panel liquid crystal display with alpha-numeric capabilities, for example, or any other type of display as will be appreciated.

A memory 140 is included in each mobile communication unit 66 for storing program code executed by the processor 130 for carrying out the functions described herein. The actual code for performing such functions could be easily programmed by a person having ordinary skill in the art of microprocessor programming in any of a number of conventional programming languages based on the disclosure herein. Consequently, further detail as to the particular code has been omitted for sake of brevity. The memory 140 also serves as a storage medium for storing information packets received from or intended to be transmitted to a base station 54 as discussed herein.

Furthermore, the memory 140 stores an identification code which is used to designate and distinguish the mobile communication unit 66 from the other mobile communication units 66 registered to the network backbone 52 and/or within the system 50. As discussed in greater detail below, the identification code in the preferred embodiment is an 8-bit code assigned by the host computer 60. The memory also stores a 32-bit random number generated by the processor 130 of the mobile communication unit 66. The 32-bit random number affords to further designate and distinguish the mobile communication unit 66 from the other mobile communication units 66 registered to the network backbone 52 and/or within the system 50.

Each mobile communication unit 66 also includes its own RF section 142 connected to the processor 130. The RF section 142 includes an RF receiver which receives the RF transmissions from a base station 54 via an antenna 67 and demodulates the signal to obtain digital information modulated therein. The RF section 144 also includes an RF transmitter 146. In the event the mobile communication unit 66 is to transmit information to the network backbone 52 in response to an operator input at input device 132, for example, the processor 130 forms within the memory 140 an information packet including data together with a source address (i.e., the address of the particular mobile communication unit 66 sending the information) and a destination address (e.g., the host computer 60 or other network device). The information packet is then delivered to the RF transmitter 146 which transmits an RF signal with the information packet modulated thereon via the antenna 67 to the base station 54 with which the mobile communication unit 66 is registered.

Like the antenna 62 of the base station, the antenna 67 of the mobile communication units may be of any type suitable for use in a network cellular communication system, such as an omni-directional antenna, a yagi-type antenna, etc. A geographic cell 71 associated with each mobile communication unit 66 defines a region of coverage in which successful wireless communications may occur. Depending on the type of antenna 67 selected and output power of the respective mobile communication unit 66, the geographic cell may take one of several different forms and sizes. For example, the antenna 67 could be an omni-directional antenna if a generally spherical cell area $71_b$ of coverage is desired. A directed yagi-type antenna could be used as the antenna 67 for a more directed elliptical cell area $71_a$ of coverage.

Figure 4A:
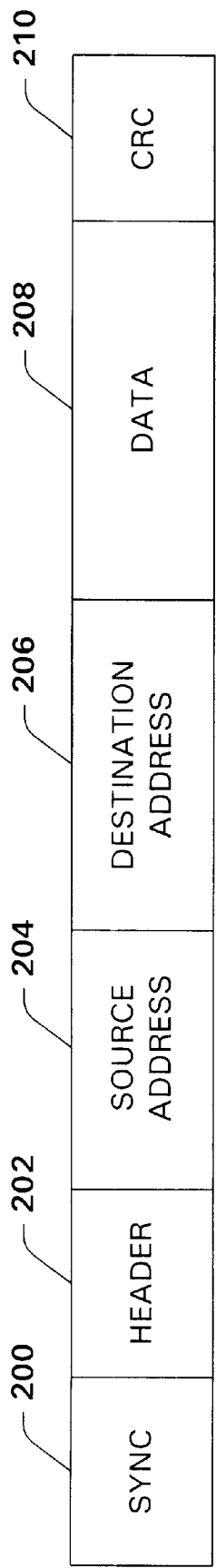
FIG. 4A is a schematic diagram representing an exemplary format for information packets which are communicated between devices in the cellular communication system in accordance with the present invention.
Figure 4B:
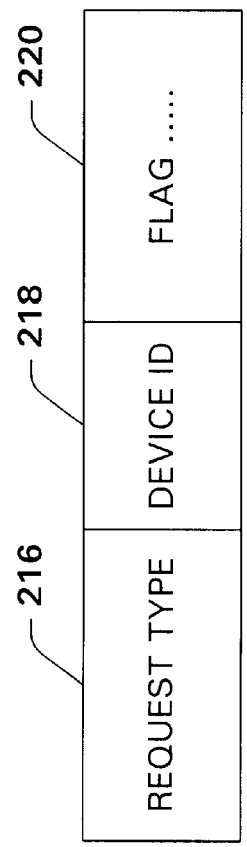
FIG. 4B is a schematic diagram representing the information found in a data field of the information packet of FIG. 4A.

Referring briefly to FIGS. 4A and 4B, an exemplary format for packets sent between devices in the system 50 is shown. Each packet includes a number of fields such as a synchronization field 200, a header field 202, a source address field 204, a destination address field 206, a data field 208, and an error correcting field (CRC) 210, for example. The synchronization field 200 includes synchronizing bits which allow a device receiving the packet an opportunity to "sync" to the packet as is conventional. The header field 202 follows the synchronization field 200 and includes information such as the length, type of the packet and a temporary address or identification code assigned by the host computer 60 (discussed in greater detail below). For example, the header field 202 may indicate whether the packet is a type which requires a response from the receiving device. The source address field 204 follows the header field and includes an address of the device from which the packet originated. Following the source address field 204, the packet includes a destination address field 206 which holds the address of the device to which the packet is ultimately destined. The data field 208 in the packet includes various information (see FIG. 4B) intended to be communicated to the receiving device. The packet ends with a cyclical redundancy code (CRC) field 210 which serves as an error correcting field according to the conventional techniques such that a receiving device can determine if it has properly received the packet.

FIG. 4B illustrates in greater detail the information contained in the data field 208 of packets transmitted from mobile communication units 66 to base stations 54. The data field 208, includes a request type field 216 which identifies the type of request being made by the mobile communication device 66 to the destination device. For example, the request type field 216 may indicate that an initial session request is being made, or a final session request is being made, etc. The data field 208 also includes a device ID field 218 which contains an identification code (e.g., 32-bit random number) for the particular mobile communication unit 66. The 32-bit random number, in addition to the identification code in the header field 202, further identifies and distinguishes the mobile communication unit 66 to the network backbone 52 with respect to other mobile communication units 66 within the communication system 50.

Figure 5A:
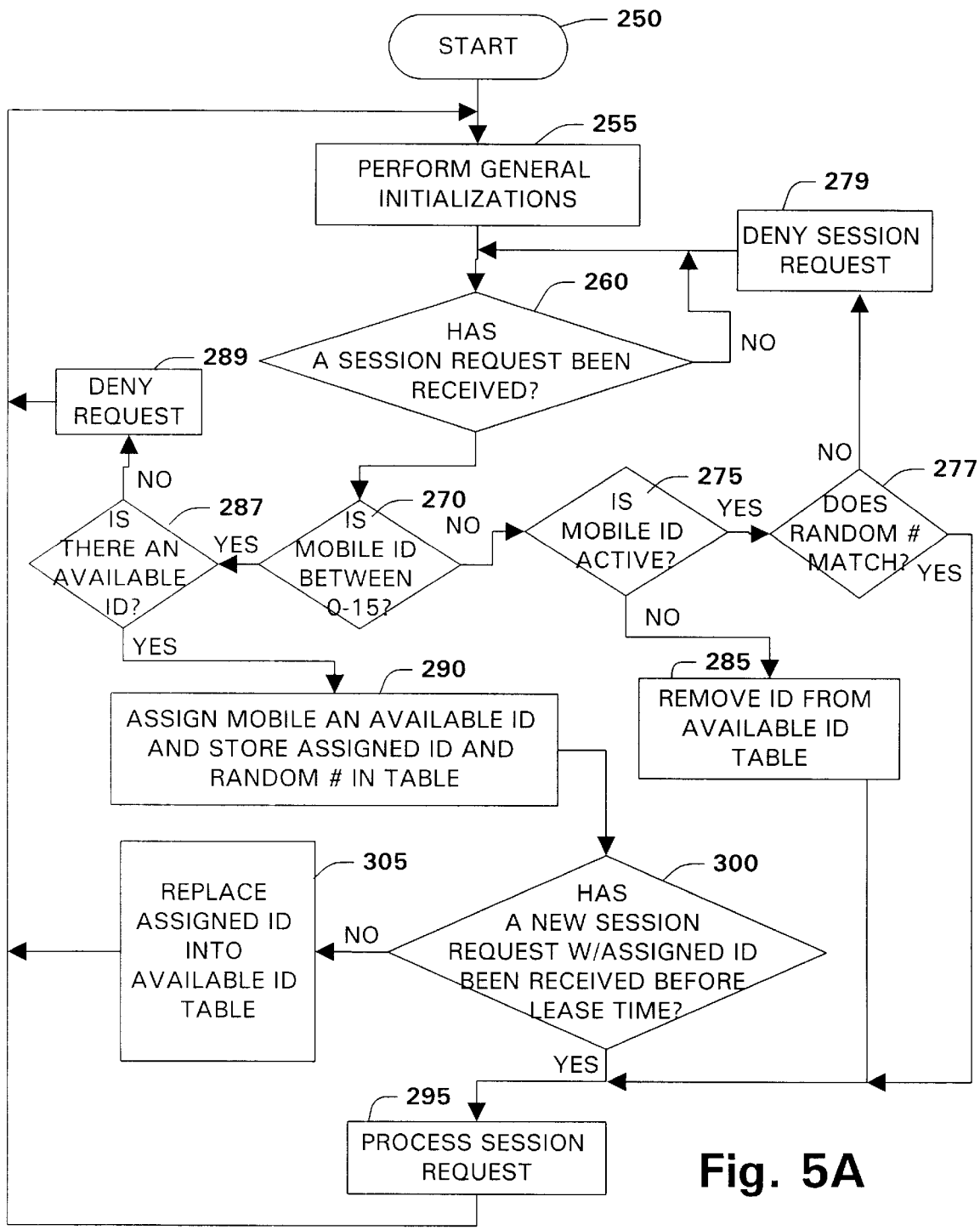
FIG. 5A is a flowchart suitable for programming the operation of a host computer so that it may determine if a mobile communication unit has a valid identification code and if not assigning the mobile communication unit a valid identification code.

FIG. 5A illustrates the operation of the host computer 60 with respect to determining if a mobile communication unit 66 attempting to access the network 52 is requesting an identification code to be assigned and if the mobile communication unit 66 is requesting an identification code be assigned by, for example, attempting to start a session with a temporary ID then the host computer 60 assigning the mobile communication unit 66 a valid ID. In step 250, the host computer 60 is initially powered up (e.g., the host computer 60 is turned "on" via a switch). Alternatively, the host computer 60 may be powered up in the sense that it is reset in step 250. In step 255, the host computer 60 goes through any self-initialization routines and the like that may be desired. Following step 255, the processor 103 in the host computer 60 goes to step 260 where it determines if a mobile communication unit 66 has requested a new session. If not, the processor 103 returns to step 260 where it continues to wait for a session request. It will be appreciated, however, that the host computer 60 continues all other normal operations substantially simultaneously with the all the processes described in FIG. 5A and is of course not limited to performing only this routine.

If in step 260, the processor 103 does receive a session request, the processor continues to step 270. In step 270, the processor 103 first evaluates the packet received by the mobile communication unit 66 to determine if the header has an identification code between 0–15. As is described in more detail below, by selecting a mobile ID code between 0–15, the mobile terminal is implicitly requesting the host computer to assign it a unique mobile ID code for future use. If in step 270, the processor 103 determines the mobile ID associated with the session request is not between 0–15, thereby indicating that the mobile communication device is not requesting a mobile ID to be assigned, the processor 103 continues to step 275. A mobile communication unit 66 may not be requesting a unique mobile ID if, for instance, the mobile communication unit 66 was preprogrammed with such an ID or is re-starting a session after already having been assigned a mobile ID. Thus, in step 275, the processor 103 checks to see if the mobile ID with which the mobile communication unit 66 is requesting a session is currently available as determined by reviewing the table of available identification code (see FIG. 7B). If the mobile ID is active and therefore not available, then the processor 103 goes to step 277. In step 277, the processor 103 reviews the random number associated with the active mobile ID currently requesting a session. If the random number does not match the random number stored in the table shown in FIG. 7A (see below), the processor 103 determines that the mobile ID has been assigned to another device and therefore denies the session request in step 279 before returning to step 260. If, however, the processor 103 determines that the random number sent from the mobile communication unit 66 requesting the session matches the mobile ID stored in table 7A, then the processor 103 assumes this mobile communication unit 66 is the same device which was earlier assigned the mobile ID and therefore continues to step 295 where the session request is processed.

If in step 275 the processor 103 determines the mobile ID used in making the session request is not active, the processor 103 continues to step 285 where it removes the mobile ID from the table of available ID codes so that no future mobile communication unit 66 later is assigned this same ID. The processor 103 then processes the session request in step 295 by acknowledging that the session has begun. Finally, the processor 103 returns to step 260.

If in step 270, the mobile ID is between 0–15, the processor 103 will continue to step 287 where the processor 103 reviews its table of available IDs to determine if any IDs are still available. The mobile IDs between 0–15 have been reserved by the host computer 60 for the purpose of processing requests for a unique mobile ID to be assigned although other ranges and/or specifically reserved mobile ID values could have been used. In the event there are two or more pending requests for a mobile ID from mobile communication units 66 which have randomly selected the same temporary ID between 0–15, the processor 103 differentiates the mobile communication units based on the 32 bit random number each mobile communication unit 66 forwarded to the host computer 60 along with the temporary mobile ID. The 32 bit random number is sometimes referred to as a random cookie in the art. By implementing this routine, mobile communication units 66 can be assigned a unique ID without the need for a worker to physically handle and pre-program the mobile communication unit prior to its use in the cellular communication system 50. Thus, returning to step 287, if the processor 103 determines there are no available mobile IDs left to be assigned, the processor 103 denies the mobile communication unit's 66 session request in step 289 before returning to step 260. No mobile IDs may be available if, for example, the host computer 60 can only handle a maximum number of sessions (i.e. 30) at any given time and the maximum number of sessions are currently in progress. If, on the other hand, an available mobile ID still remains, the processor 103 continues to step 290. In step 290, the processor 103 stores the assigned mobile ID and the random number associated with the mobile communication unit's 66 request in a table (see FIG. 7A) while also removing the assigned mobile ID from the table of available identification codes (see FIG. 7B). Following step 290 the processor 103 continues to step 300 where it waits for a predetermined period of time to receive from the same mobile communication unit 66 just assigned a mobile ID a new session request. The predetermined period of time the processor 103 waits for the new session request may be referred to as the lease time. The purpose of the lease time is to ensure that mobile IDs which are allocated in the system are actually being used by the mobile communication units 66 to which they are assigned. If, therefore, a mobile communication unit is assigned one of the available mobile IDs, but does not attempt to begin a new session using this ID within the lease time granted, then the processor 103 will place this mobile ID back into the category of available mobile IDs such that another mobile communication unit 66 may later be given this mobile ID. In this way the processor 103 can better ensure that the maximum number of active mobile communication units 66 can begin a session and all available mobile IDs are not taken up by mobile communication units 66 which never began a session. Thus, in the present embodiment there is a two minute lease time afforded by the processor 103 which is an amount determined to be sufficiently greater then the amount of time it would typically take any mobile communication unit 66 to request a new session after receiving a mobile ID. If a new session request is not received within the least time afforded in step 300, the processor 103 goes to step 305 where it re-inserts the mobile ID just granted to the table of available codes. The processor 103 then returns to step 260. If, however, in step 300 a new session request is received using the assigned mobile ID, the processor 103 goes to step 295 where it processes the session request before returning to step 260.

Although the invention has been shown and described with respect to the processor 103 of the host computer 50 making the determination of whether a mobile communication unit 66 is attempting to access the network with a valid ID, it is understood that the processor other than processor 103 may be employed to make the determination. For example, a processor 98 that is part of the base station 54 could be employed to accomplish the determination of a mobile communication unit 66 attempting to access the network with a valid ID. Furthermore, a processor associated with a dedicated network device programmed to assign identification codes to the mobile communication unit 66 in accordance with this invention could also be used.

Figure 5B:
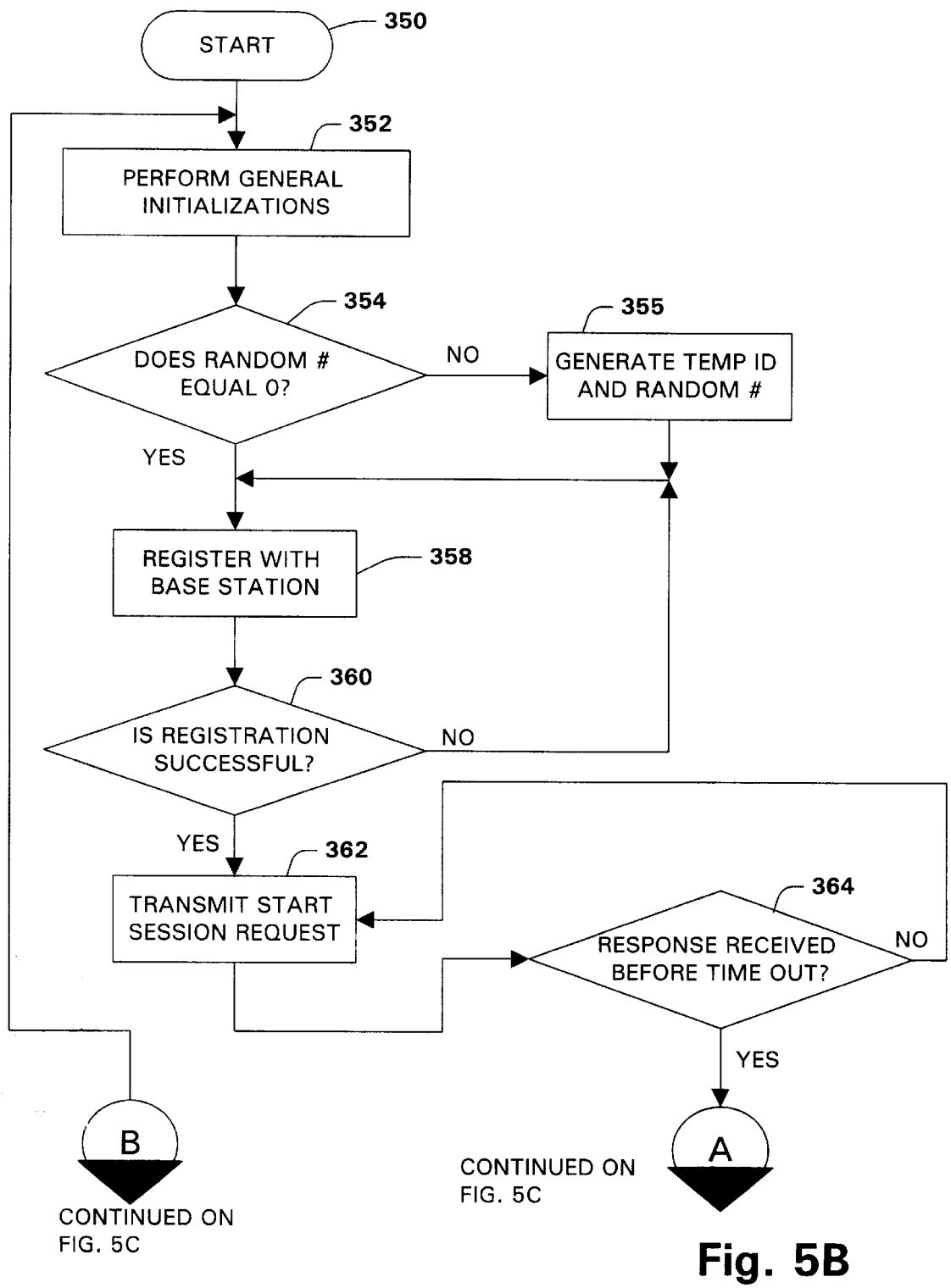
FIGS. 5B–5C show a flowchart suitable for programming a mobile communication unit in accordance with the present invention.
Figure 5C:
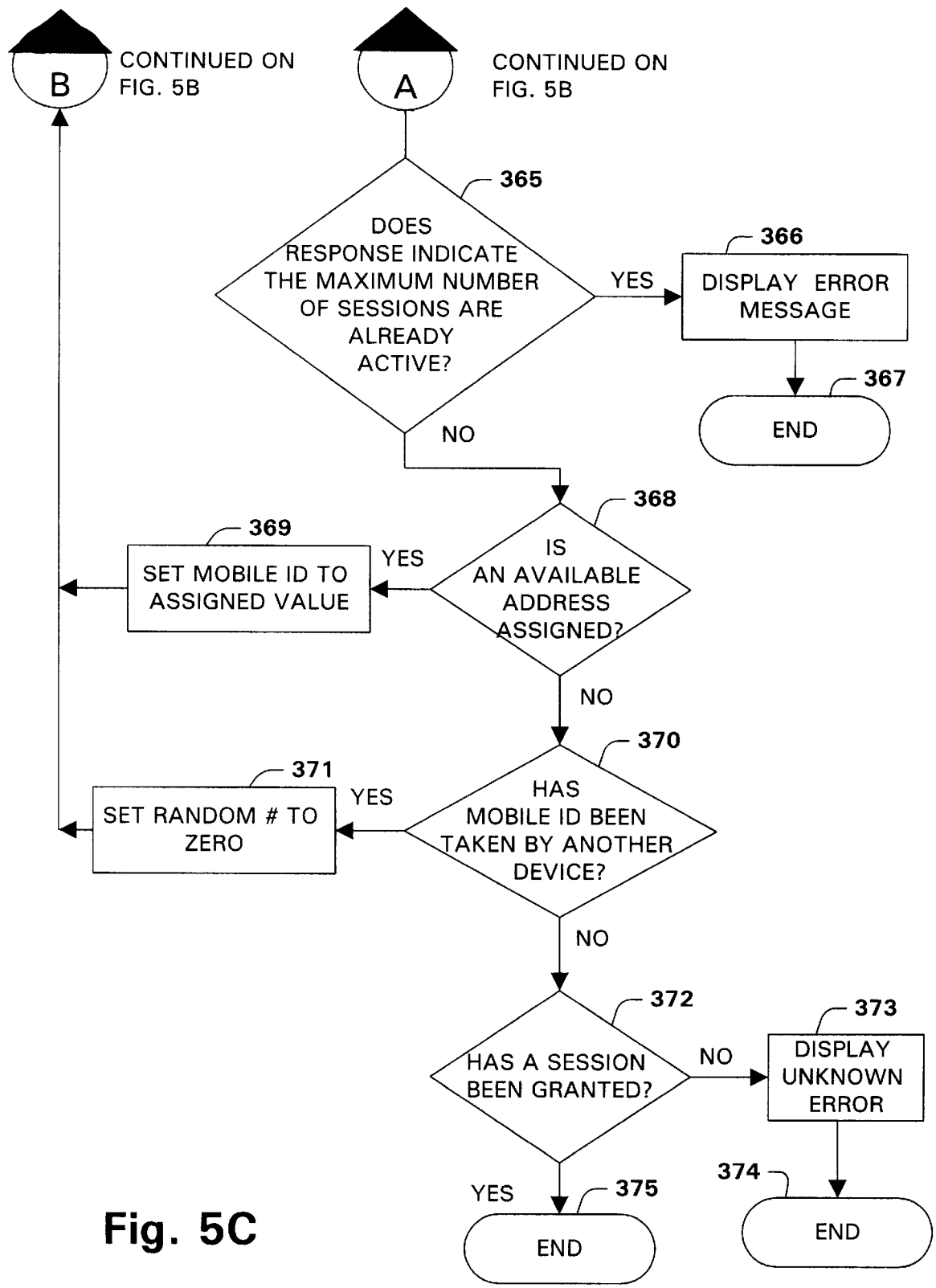

Referring now to FIGS. 5B–5C, a flow chart illustrating the flow of a mobile communication unit 66 operating in accordance with the present invention is shown. More specifically, following a power on or reset of the mobile communication unit 66 in step 350, the mobile communication unit's processor 130 moves to step 352 where it performs any general initialization routines which may be required. For instance, such general initialization routines may include clearing all temporary memory and registers and loading them with new default values if necessary. Following the general initialization routines, the processor 130 continues to step 354 where it determines if it already has a random number associated with itself. If the value stored by the mobile communication unit 66 for the random number is currently zero, then the processor 130 knows it must assign or reassign itself a temporary mobile ID and a random number and therefore goes to step 355. The temporary ID selected in step 355 is a value between 0–15 while the random number is a 32 bit random number. As is discussed in more detail below, the mobile communication unit 66 uses the 32 bit random number to help differentiate it from other mobile communicates 66 which may be communicating with the same mobile ID. Following step 355, the processor 130 continues to step 358 where it directs the mobile communication unit 66 to attempt to register with a base station.

If in step 354, the random number did not equal zero then the mobile communication unit 66 will already have a mobile ID (perhaps from a previous session) and therefore the processor 130 continues directly to step 358. In step 358 the processor 130 attempts to register with a base station 54 such that communication between the mobile communication unit 66 and other devices coupled to the network such as the host computer 60 can be established. In step 360, the processor 130 determines if a successful registration with a base station 54 has been completed and, if not, returns to step 358 where it is attempted again. Once registration with a base station 54 is completed, the processor 130 continues to step 362 where it requests a new session with the host computer 60 using its mobile ID and 32 bit random number. As just mentioned, the mobile ID at this point may be a temporary ID between the values of 0–15 or may be an ID which was assigned to this particular mobile communication unit 66. Following step 362, the processor 130 in step 364 waits for a predetermined period of time for a session response to be returned to it from the host computer 60. If a response is not received in the predetermined period of time, the processor 130 returns to step 362 and again transmits a start session request. If, however, a response is received, the processor continues to step 365 (FIG. 5C) where the type of response received is evaluated for further processing.

If the response received from the host computer 60 indicates to the mobile communication unit 66 that all available IDs are already in use, the processor 130 goes to step 366 where it displays an error message to the user indicating that such a situation has occurred. The processor 130 ends this routine in step 367 and does not start the routine again unless the operator in some manner initiates a new session again.

If in step 365 the response does not indicate that all mobile IDs are taken up, the processor 130 continues to step 368 where it evaluates the response to determine if a new mobile ID value has been assigned from the available mobile ID table (FIG. 7B). If the mobile communication unit 66 had originally requested a session with a mobile ID between 0–15 then the host computer 60 will have responded to the session request by assigning one of the available mobile IDs. In this instance, the processor 130 will continue to step 369 where it sets the assigned mobile ID into its memory and then continues back to step 354 to restart a session with the host computer using the assigned mobile ID value. If, in step 368 the host computer's 60 response does not indicate that a new mobile ID is assigned, then the processor continues to step 370.

In step 370, the processor 130 determines if the mobile ID which the mobile communication unit 66 is attempting to register has been taken by another device currently in session. As described above, this is done by the host computer 60 comparing the mobile ID used to request a new session with with the random numbers stored in the table shown in FIG. 7A. If the mobile ID being used does not match the random number associated therewith, then the host computer 60 must have reassigned this particular mobile ID to another unit for one of a number of possible reasons. For example, the mobile communication unit 66 may not have attempted to start a new session within the lease time afforded by the host computer 60 and therefore the mobile ID assigned was made available again, or the mobile communication unit 66 may have been non-operative for a period of time long enough for the host computer 60 to have assumed the mobile communication was no longer in its system and therefore made their mobile ID available. To any extent, if the mobile ID has been taken by another device, then the processor 130 continues to step 371 where it sets its random number to zero again so that upon returning to step 354 a new random number and temporary ID will be self assigned.

If in step 370, the mobile ID has not been taken by another mobile communication unit 66, then in step 372 the processor 130 determines if the host computer's response granted the session request. If the session is not granted, the processor 130 goes to step 373 where it displays an error message to the operator informing the operator that for reasons unknown, the session request was not granted. The processor 130 then ends the new session request attempt in step 374. If, however, in step 370 the host computer 60 indicates in its response that the session request is granted, the processor 130 starts its normal operations mode and ends this routine as indicated by step 375.

Figure 6:
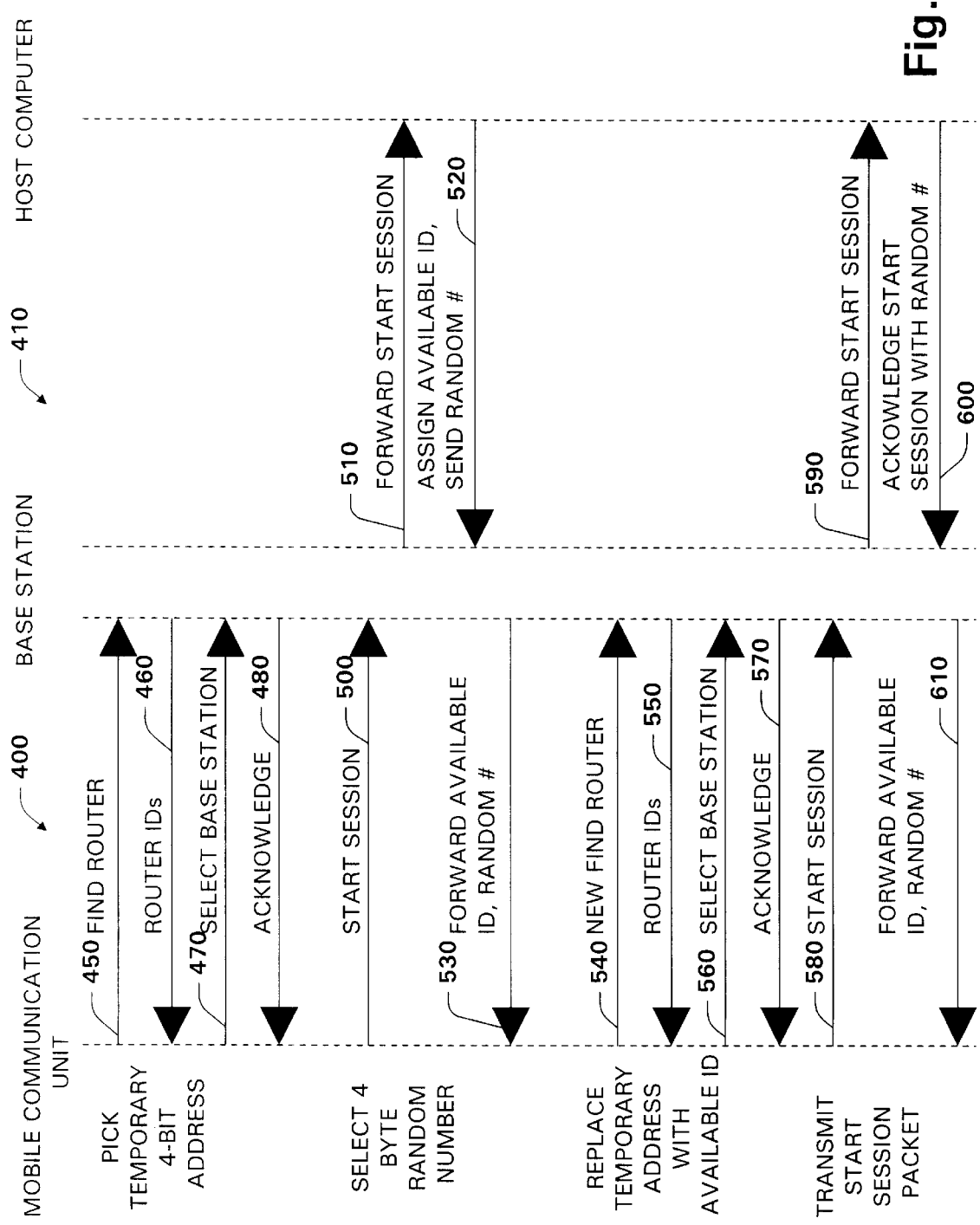
FIG. 6 is a flow diagram illustrating a manner in which a mobile communication unit attempts to access a communication network without a valid identification code or any identification code at all, and a host computer assigning the mobile communication unit a valid identification code so that it can access the network in accordance with the present invention.

Referring now to FIG. 6, a flow diagram illustrating an exemplary embodiment of a mobile communication unit 66 attempting to register to the communication network is shown. In this flow diagram, two levels of communication are shown. The first level 400 is between a mobile communication unit 66 and a base station 54; the second level is between the base station 54 and a host computer 60. Initially, the mobile communication unit 66 selects a temporary address which is a number between 0–15. This temporary address is known by the host computer 60 to be a dummy address which is employed for initial communication by the mobile communication unit 66. The mobile communication unit 66 selects the temporary address randomly as discussed above.

The mobile communication unit 66 must first register to the base station 54 before it can communicate to the host computer 60. Thus, in step 450 the mobile communication unit broadcasts a find router to all base stations 54 within the network. This allows for all the base stations 54 in step 460 within communication range of the mobile communication unit to respond with their respective base station IDs so that the mobile communication unit 66 can select the best base station 54 to communicate to the network through. Thus, in step 460 the base stations 54 respond back with their respective IDs. In step 470 the mobile communication unit 66 selects the best base station 54 to communicate to the network through. Then in step 480 the selected base station 54 acknowledges to the mobile communication unit 66 that it knows it has been selected. After this step, the mobile communication unit 66 is now able to communicate with the host computer 60 with the temporary address it selected.

The next set of steps involves the mobile communication unit attempting to begin a session using the temporary address selected and a 4-byte (32-bit) random number. This 4-byte random number is used because there could be more than 16 mobile communication units 66 in the system 50. The mobile communication unit 66 places the randomly generated number in a packet. The temporary address is placed in the header field 202 and the 32-bit random number is placed in a data field. In step 500 the packet is sent in a start session request to the base station 54 with an ultimate destination of the host computer 60. In step 510, the base station 54 forwards the start session request packet to the host computer 60. In step 520, the host computer 60 is shown to respond with an available (valid) ID from a table of available IDs stored in its memory (see FIG. 7B). The base station 54 in step 530 forwards the available ID along with the 32-bit random number to the mobile communication unit 66. As discussed above, the 32-bit random number is employed by the mobile communication unit 66 to confirm that the available ID that it is receiving is actually meant for it. For example, if in steps 450–480 two mobile communication units 66 employ identical temporary 4-bit addresses, the 32-bit random numbers could be used by the two mobile communication units 66 in step 530 to determine which available ID and random number correspond to which mobile communication unit 66. After step 530, the mobile communication unit 66 replaces its 4-bit temporary address with the available ID provided by the host computer 60.

Next, with its new ID, the mobile communication unit 66 repeats in steps 540–580 essentially the same protocol of steps 450 through 480. In step 540 the mobile communication unit 66 broadcasts a final router to all base stations 54 within the system 50 that it desires to access the network 52. In step 550 all base stations 54 within communication range of the mobile communication unit 66, respond with their respective base station IDs so that the mobile communication unit 66 can select the best base station 54 to communicate to the network through. In step 560, the mobile communication unit 66 selects the best base station 54 to communicate to the network through. Then in step 570 the selected base station 54 acknowledges to the mobile communication unit 66 that it knows it has been selected. After this step, the mobile communication unit 66 is now able to communicate with the host computer 60 with a valid ID.

The next set of steps involves the mobile communication unit 66 initiating a start session request. However, in this session request the mobile communication unit 66 places the available ID in the packet header 202 and the previously generated 32-bit random number in the data field header 208. In step 580, the packet is sent in a start session request to the base station 54 with an ultimate destination of the host computer 60. In step 590, the base station 54 forwards the start session request packet to the host computer 60—the packet including the available ID and the 32-bit random number. In step 600, the host computer 60 acknowledges the start session request and sends back its acknowledgment with the mobile communication unit's 66 respective 32-bit random number. In step 610, the base station 54 forwards the best computer 60 acknowledgement to the mobile communication unit 66. The 32-bit random number is employed at this point to prevent possible confusion with another mobile communication unit 66 which has entered the system 50 and is already employing the same ID as the ID assigned to the mobile communication unit 66 in step 520. Thus, the random number affords the host computer 60 a means to distinguish between possible duplicate devices.

Returning briefly to step 520, upon assigning an available ID to the mobile communication unit 66 the host computer begins calculating the lease time. As discussed above, the lease time is the amount of time the host computer 60 grants the mobile communication unit 66 which is assigned an available ID to start a new session with the ID. In this particular embodiment, the lease time is two minutes. Thus the mobile communication unit 66 must attempt to start a session using the newly assigned ID (step 580) prior to the lease time expiring so that the host computer 60 can better ensure that all assigned IDs are being used by active mobile communication units 66. In addition to the lease time, the host computer 60 will additionally provide an inactivity time-out period for sessions in progress. More particularly, if no communication occurs between the host computer 60 and a mobile communication unit 66 which was previously assigned an ID within a given time period (i.e., 48 hours) then the host computer 60 returns the assigned ID to its table of available IDs. In this manner, the host computer 60 can safeguard against mobile communication units 66 disappearing during a session and holding the ID indefinitely.

Although the preferred embodiment discussed above employed a lease time with duration of two minutes, it is understood that any suitable lease time based upon the above concerns or any additional concerns may be used. It will be appreciated that all lease and inactivity values are configurable in order to afford for optimization on a per network basis.

Referring now to FIGS. 7A and 7B, identification code tables which are stored in the processor 103 of the host computer 60 are shown. The table in 7A lists each mobile communication unit 66 currently assigned an identification code by the host computer 60. The table includes two columns, the first column lists the 8-bit identification code assigned to the mobile communication unit by the host computer, the second column lists the 32-bit random number generated by the mobile communication unit. For example, mobile communication unit 66F has an 8-bit identification code of 00010001 and it generated in step 500 a 32-bit random number 00000000000000000000000100100101; mobile communication unit 66G has an 8-bit identification code of 00010010 and it generated in step 500 a 32-bit random number 00000000000000000000010100101101; mobile communication unit 66H has an 8-bit identification code of 00010011 and it generated in step 500 a 32-bit random number 00000000000000000000000101101111; mobile communication unit 66I has an 8-bit identification code of 00010100 and it generated in step 500 a 32-bit random number 00000000000000000000000000000011; and mobile communication unit 66J has an 8-bit identification code of 11111110 and it generated in step 500 a 32-bit random number 11111111111111111111111111111101. In this manner, the host computer 60 can keep track of the mobile communication units 66 within the system and permit or deny access to the network based on the identification code and the 32-bit random number.

FIG. 7B shows a table of available identification codes which is also maintained by the host computer 60 in its memory. This table lists all of the available identification codes that the host computer 60 may assign to mobile communication units 66 desiring to access the network. Since identification codes 0–15 have been received to enable the mobile communication units 66 to request an available ID, these values are not included in the table of available IDs. For instance, in the current example, mobile communication units 66F–66J have been assigned respectively the following 8-bit identification codes: 00010001; 00010010; 00010011; 00010100; and 11111110. Since these identification codes are already assigned to mobile communication units 66, they will not be available for assignment to other mobile communication units 66. Accordingly, these used identified codes are not maintained in the table of available identification codes. As can be seen from the table, all identification codes but the afore-mentioned five codes assigned to mobile communication units 66F–66J and codes 0–15 are available for assignment. Once a new mobile communication unit 66 is assigned an identification code in step 520, that particular identification code is dropped from the table of available identification codes and is added to the table of occupied identification codes and the corresponding 32-bit random number associated with the new mobile communication unit. Additionally, if one of the mobile communication units 66F–66F, already assigned an identification code is dropped from the system the associated identification code is added to the table of available identification codes.

Although this invention has been described with respect to an 8-bit code assigned by the host computer 60 and a 32-bit random number (i.e., an available ID) generated by the processor 130 of the mobile communication unit 66, it is to be understood that the scope of this invention is not limited to such embodiment. For example, it will be appreciated that the bit size of the code and/or the random number can be varied in accordance with the capacity of the system and components that the presented invention is incorporated with. Furthermore, it will be appreciated that the code may be assigned by a component other than the host computer 60, for instance, the code may be assigned by a base station or a device specifically designated for assigning the code. Likewise, it will be appreciated that the random number may be assigned by a device other than the mobile communication unit 66.

Additionally, the present invention as been described with the temporary address or identification code stored in the header field 202 of the packet. However, it is to be understood that the scope of the present invention is intended to include the temporary address or identification code being stored in any field or format suitable for conveying this type of information between the mobile communication unit 66 and a destination device. Furthermore, the present invention is not limited to the mobile communication unit 66 using a temporary ID as a way of requesting an available ID to be assigned. For instance, the mobile communication unit 66 could set a flag bit in a packet directed to the host computer 60 or other suitable device to indicate that the mobile communication unit 66 is requesting that an available ID be assigned.

Moreover, it will be appreciated that the present invention is not intended to be limited to the process described herein for determining if a mobile communication unit 66 is attempting to access the network without a valid identification code or no code at all. It will be appreciated that any combination of the iterations described above and/or other steps for making the determination that a mobile communication unit 66 is attempting to access the network without a valid identification code or no code at all falls within the scope of the invention. Also, it is to be understood that any combination of the iterations described above and/or other steps for assigning the mobile communication unit 66 a valid ID by the host computer 60 or any other suitable device falls within the scope of this invention.

Additionally, the present invention has been described with the identification code tables being stored in the processor 103 of the host computer 60. It will be appreciated that these tables can be stored in the memory of any device suitable for carrying out the present invention. Moreover, it is to be understood that the tables may be of any size conducive to the capacity of the memory and device the tables are stored in and the overall system capacity.

Lastly, it is to be appreciated that the scope of the present invention is intended to include any system which identifies a mobile communication unit 66 attempting to access a network without a valid identification code or any identification code at all, and where the system provides the mobile communication unit with a valid identification code so that it can access the network.

The present invention includes all such equivalents and modifications.

What is claimed is:

1. A network communication system comprising:

a network backbone;

at least one mobile communication unit including a transmitter system for wirelessly transmitting information and a receiver system for wirelessly receiving information, the at least one mobile communication unit further including circuitry for registering to the network backbone; and a device coupled to the network backbone, the device including circuitry for allocating an available ID to the at least one mobile communication unit, the at least one mobile communication unit using the available ID to register to the network backbone substantially constantly from each of a plurality of cells while the at least one mobile communication unit is roaming.

2. The network communication system of claim 1, wherein a temporary ID is selected by the circuitry for registering to the network backbone in the event the mobile communication unit has not been assigned an available ID.

3. The network communication system of claim 2, wherein in the event a temporary ID is selected for registering to the network backbone, the circuitry for registering to the network backbone also selects a random number for use in distinguishing the mobile communication unit by the device upon the mobile communication unit attempting registration to the network backbone.

4. The network communication system of claim 2, wherein the device coupled to the network backbone attempts to assign an available ID to the mobile communication unit in the event the mobile communication unit attempts to register to the network backbone with the temporary ID.

5. The network communication system of claim 4, wherein the device includes a table of available IDs and each time a particular ID included in the table of available IDs is assigned, the particular ID is removed from the table of available IDs.

6. The network communication system of claim 5, wherein the device further includes circuitry for refusing registration to the network backbone in the event the mobile combination unit attempts to register to the network backbone using an ID which is not included in the table of available IDs.

7. The network communication system of claim 4, wherein the device is a host computer.

8. The network communication system of claim 4, wherein the device is a base station.

9. A communication system with identification code assignment, comprising:

at least one mobile terminal;

a network;

a host computer coupled to the network;

at least one base station coupled to the network, the at least one base station including circuitry for wirelessly transmitting and receiving information, and providing the at least one mobile terminal with access to the network such that the at least one mobile terminal can communicate with the host computer; and at least one processor in the communication system for determining if the at least one mobile terminal is requesting an available identification code be assigned, wherein the processor is capable of attempting to assign an available identification code to the at least one mobile terminal in the event the at least one mobile terminal is requesting an available identification code be assigned, the particular mobile terminal employing the available identification code to register to the network backbone substantially constantly from each of a plurality of cells while the at least one mobile terminal is roaming.

10. The communication system of claim 9, wherein the mobile terminal requests an available identification code be assigned by attempting to begin a session with the at least one processor using a temporary identification code.

11. The communication system of claim 9, wherein the processor maintains a table of available identification codes.

12. The communication system of claim 9, wherein the host computer includes the at least one processor.

13. A mobile terminal, comprising:

a transmitter system for wirelessly transmitting communication;

a receiver system for wirelessly receiving communication; and circuitry for beginning a session with a network backbone, wherein in the event the mobile terminal has not already been assigned an available ID, the circuitry for beginning the network backbone session transmits a request for an available ID to be assigned, the mobile terminal using the available ID to register substantially constantly to the network backbone from each of a plurality of cells while the mobile terminal is roaming.

14. The mobile terminal of claim 13, wherein the mobile terminal transmits a request for the available ID to be assigned by transmitting a request for the session using a temporary ID, the temporary ID being generated by the mobile terminal.

15. The mobile terminal of claim 14, wherein the temporary ID is selected from among a predefined set of temporary IDs.

16. The mobile terminal of claim 15, wherein upon receiving the available ID in response to the mobile terminal's request for the available ID, the mobile terminal attempts to begin a session using the available ID.

17. A host computer, comprising:

means for determining whether an ID is currently available; and means for allocating an available ID to a mobile terminal requesting an available ID be assigned;

wherein the host computer recognizes a request by the mobile terminal to begin a session using a temporary ID from a predefined set of temporary IDs as being a request by the mobile terminal to have an available ID be assigned, the available ID providing for substantially constant registration to a network backbone by the mobile terminal from each of a plurality of cells while the mobile terminal is roaming.

18. A method of assigning a mobile communication unit an ID for registration to a communication network, the communication network including a network backbone and a host computer coupled to the network backbone, the method including the steps of:

receiving at the host computer a request from a mobile communication unit to have an available ID assigned to the mobile communication unit;

determining by the host computer if there remains any available IDs to be assigned; and transmitting to the mobile communication unit from the host computer an available ID to be assigned, in the event there remains any available IDs, the mobile communication unit using the available ID to constantly register to the network backbone, the available ID affording for registration to the network backbone by the mobile terminal from each of a plurality of cells while the mobile terminal is roaming.

19. The method of claim 18, wherein the host computer recognizes the use of the temporary ID by the mobile communication unit in attempting to register to the communication network as a request from the mobile communication unit to have an available ID assigned to the mobile communication unit.

20. The method of claim 18, wherein the host computer maintains a list of available IDs for determining if there remains any available IDs to be assigned.

* * * * *